United States Patent [19]

Svanholm

[11] Patent Number: 4,613,472

[45] Date of Patent: Sep. 23, 1986

[54] PROCESS FOR THE MANUFACTURE OF AERATED CONCRETE PRODUCTS

[75] Inventor: Göte Svanholm, Örebro, Sweden

[73] Assignee: Svanholm Engineering AB, Örebro, Sweden

[21] Appl. No.: 572,545

[22] Filed: Jan. 20, 1984

[30] Foreign Application Priority Data

Jan. 24, 1983 [SE] Sweden .................. 8300342

[51] Int. Cl.⁴ .................. B29C 67/20; B28B 5/04; B28B 7/26; B28B 7/34
[52] U.S. Cl. .................. 264/42; 249/80; 264/157; 264/333; 425/195; 425/261; 425/311
[58] Field of Search .................. 264/42, 333, 157; 425/195, 261, 311; 249/80

[56] References Cited

U.S. PATENT DOCUMENTS

| | | | |
|---|---|---|---|
| 1,608,690 | 11/1926 | Ashenhurst | 264/42 |
| 2,540,354 | 2/1951 | Selden | 264/42 |
| 2,941,253 | 6/1960 | Jakobsson | 264/42 X |
| 3,236,925 | 2/1966 | Urmston | 264/42 |
| 3,247,294 | 4/1966 | Sabouni | 264/42 |
| 3,969,453 | 7/1976 | Thompson | 264/42 |
| 3,972,969 | 8/1976 | Rio | 264/42 |
| 4,057,608 | 11/1977 | Hashimoto et al. | 264/42 |
| 4,376,086 | 3/1983 | Schubert et al. | 264/42 |
| 4,402,892 | 9/1983 | Helser | 264/42 |
| 4,422,989 | 12/1983 | Hums et al. | 264/42 |

FOREIGN PATENT DOCUMENTS

| | | | |
|---|---|---|---|
| 2043029 | 5/1971 | Fed. Rep. of Germany | 264/333 |
| 2043082 | 5/1971 | Fed. Rep. of Germany | 264/42 |
| 155835 | 8/1956 | Sweden . | |
| 161506 | 11/1957 | Sweden . | |
| 224436 | 1/1969 | Sweden . | |
| 390296 | 12/1976 | Sweden . | |
| 281682 | 3/1952 | Switzerland . | |

Primary Examiner—Philip Anderson
Attorney, Agent, or Firm—Spencer & Frank

[57] ABSTRACT

A method for manufacture of aerated concrete or other similar calcium silicate hydrate products. An optimal utilization of the investment for erection of the plant is achieved by keeping the time for the stiffening of one cast body shorter than the pacing time between two consecutive pourings of mix. A suitable way to achieve the short stiffening time is to use an extremely highly reactive binder.

30 Claims, 10 Drawing Figures

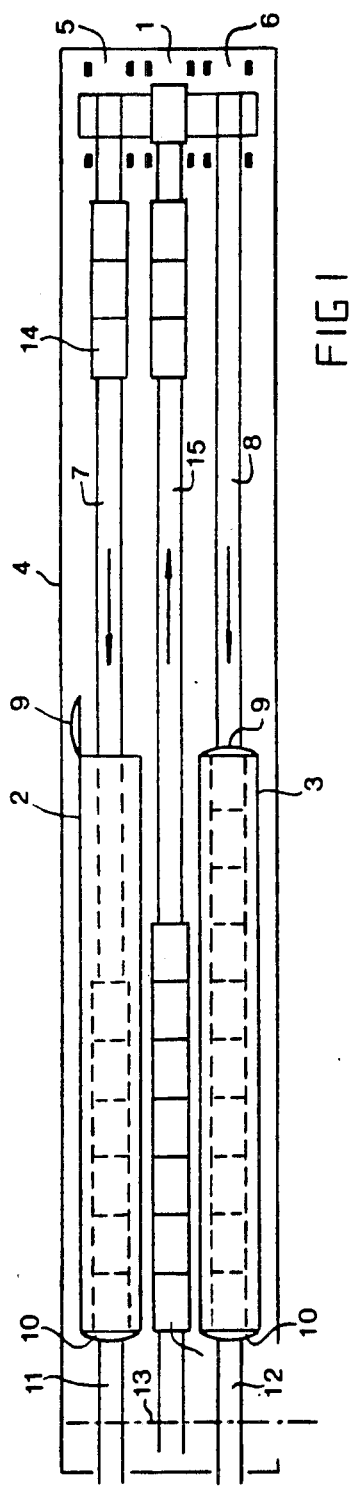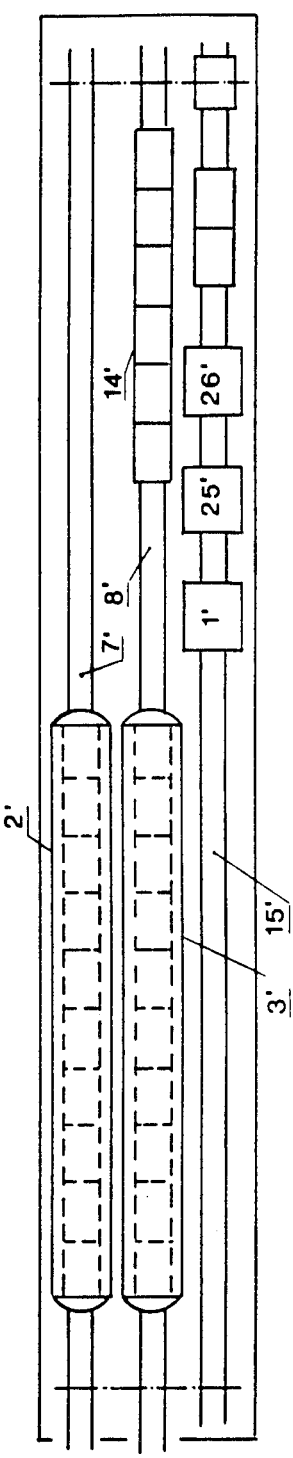

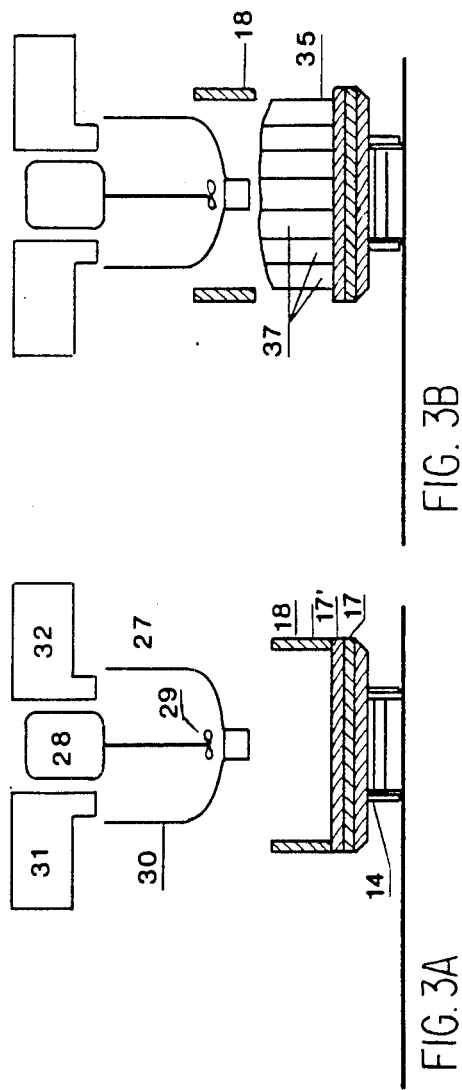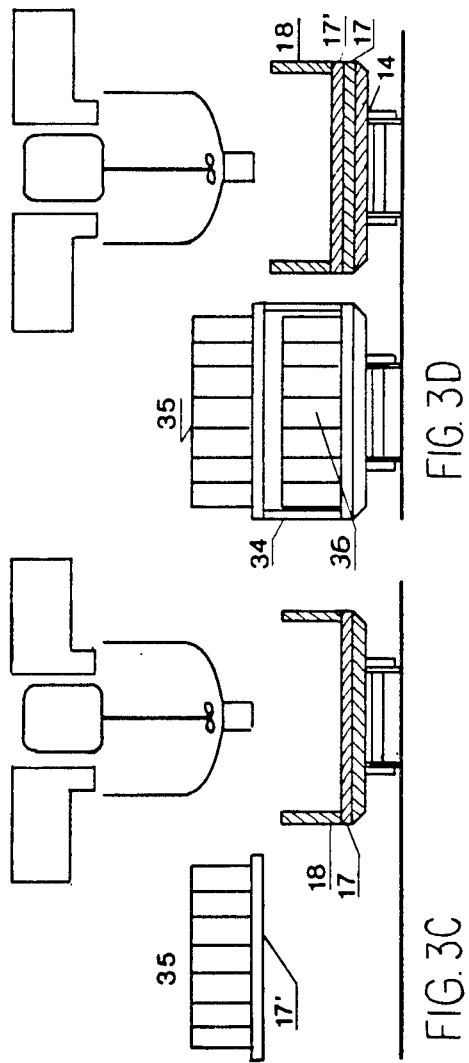

PROCESS FOR THE MANUFACTURE OF AERATED CONCRETE PRODUCTS

BACKGROUND OF THE INVENTION

Traditional aerated concrete as well as similar types of porous steam cured light weight concrete, e.g. foam concrete, is usually produced in the following way. One or several silica containing materials, such as sand, shale ashes or similar materials, as well as one or several calcareous, possibly hydraulic, binders, such as lime and/or cement, are mixed with a rising agent—which in the case of aerated concrete is aluminium powder—in water. When these materials are homogenized and in close contact, the lime (CaO) of the binder reacts with the water and the silica ($SiO_2$) material and forms what can generally be described as a calcium silicate hydrate mass at the same time as the aluminium powder reacts with water to develop hydrogen gas that gives the mass macroporosity. This pore formation means in practise that the mass rises from a limited initial volume to a relatively large volume. (The finished aerated concrete usually has a density of 0.4–0.65 $kg/dm^3$).

In practise, the rising of the mass forming components takes place in a special mould, into which they are poured from a special mixing device. After rising, the mass is allowed to stiffen in the mould during a special stiffening time. During this stiffening time a semiplastic body is formed which has a relatively low strength but which is sufficiently stiff to keep together without support from the mould and can be transported on its own. As soon as this stiffness is achieved, the body is released from the mould, whereupon the body, in one way or the other, is divided by cutting devices such as wires into separate elements having shapes that are suitable for use in the building industry. The divided body is brought to an autoclaving station in which it, for a certain period of time, is steam cured at high pressure and high temperature (170°–200° C.) in order to obtain suitable strength. Finally the body is transported from the autoclaving station to an unloading station in which the elements of each body are separated from each other and packaged and/or transported to a dispatch place.

During the above mentioned reaction between the calcareous binder and water, heat is developed. Professionals have always tried to keep this heat at the lowest possible level since a too fast a temperature increase in the mass produces difficulties in controlling the rising process. For this reason, hard burnt lime, which reacts slowly with limited development of heat, has been used throughout for the manufacture of aerated concrete on the basis of lime. This has been the case, independently of whether lime has been included in the formula as the sole binder or has been mixed with larger or smaller amounts of portland cement.

Although the use of hard burnt, slow reacting lime has ensured good control during the casting/rising process, the investigations which lead to this invention have shown that a multitude of inconveniences are connected with the use of slow reacting binders, especially if the manufacture of aerated concrete is seen from a wider perspective. A not insignificant inconvenience is that hard burnt lime is considerably more expensive than soft burnt, highly reactive lime of the type that, e.g., is used in steel manufacture (hereunder called "Steel works lime"). Another inconvenience—with more profound consequences—is that the slow reacting lime gives a relatively long stiffening time. Thus the stiffening time is usually more than 45 minutes whereas the pacing time, i.e. the time between two consecutive castings, often is as short as four to five minutes in order to obtain a high production capacity. This means, of course, that the production or manufacturing plant must have at least 12–15 moulds that are working at the same time since the body cannot be released from the mould and be divided until the necessary stiffening time is ended. In practice, however, the number of moulds is considerably greater, e.g. 20 or more, in order to fill the demands on spare- or buffer capacity.

Moulds are expensive to manufacture as well as to maintain and a considerable amount of space in the factory is necessary, something that leads to high investment costs and running costs. High investment costs mean that every plant must have high production capacity; all this has, in practice, led to erection of big, highly effective factory units, from which large amounts of different products are delivered. Manufacturing aerated concrete in this manner, however, becomes more and more untenable, especially in sparsely populated areas, where high transportation costs in combination with high investment costs make the cost for delivery of the elements, capital cost included, unacceptably high.

SUMMARY OF THE INVENTION

The objects of the present invention are to remove the inconveniences related above and to create a substantially improved ratio between production and investment for the manufacture of aerated concrete. This is achieved, in accordance with the characteristic traits of the invention, by always keeping the stiffening time (A) referred to above shorter than the pacing time (T) between two consecutive castings. This makes it possible to use mainly one mould only and to decrease the space required in the factory or plant to a minimum.

In accordance with a preferred way of implementing the invention, it is possible to achieve a stiffening time which is short in comparison with the pacing time by using an extremely high-reactive fast binder, e.g. of the steel works lime type, which will effect an exceptionally fast stiffening of the mass while keeping an optimally short pacing time. In rare cases, when demands on production capacity (i.e. the number of produced elements per unit of time) are not so great, it is, on the other hand, possible to implement the desired relation between pacing time and stiffening time by an increase of the pacing time.

The invention is preferably practiced in a plant having trucks with two mould bottoms that cooperate sequentially with a single, movable wall arrangement, which may have wires in order to cut the stiffened bodies into separate elements. The mould formed by a mould bottom and the wall arrangement receives mixed material from a special mixing device and, after the material has stiffened, the wall arrangement is removed. Two stiffened bodies that are formed in this way are carried by the truck to an autoclave for curing.

BRIEF DESCRIPTION OF THE DRAWINGS

FIG. 1 is a highly simplified top plan view of a first implementation of the invention;

FIG. 2 is a similar top plan view of an alternative second implementation;

FIGS. 3A–3D are similarly highly simplified sectional views through a casting station in the plant in FIG. 1, and show the station during different steps of the process;

DESCRIPTION OF THE PREFERRED EMBODIMENT

Figure 4:
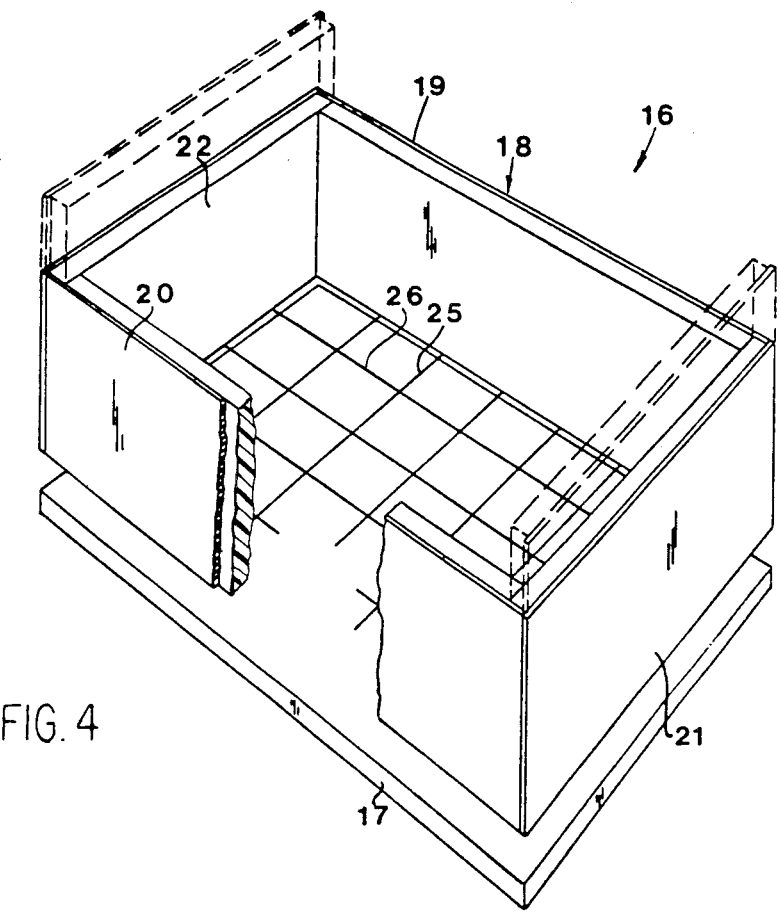
FIG. 4 is a partly cut-away perspective drawing, illustrating a mould in the plant.

The extremely simple plant, shown in FIG. 1, comprises in its main parts a casting station 1 and a steam curing station, comprising two parallel autoclaves 2,3. The plant is in a suitable way housed in a factory building 4. The casting station 1 is centrally located between two waiting positions 5 and 6 respectively. These waiting positions are connected with the autoclaves 2,3 by transport tracks 7,8 for the introduction of bodies into the autoclaves in the direction indicated by the arrows.

Each autoclave has two doors 9 and 10, one at the entrance end and one at the exit end. At the exit there are further transport tracks 11 and 12 respectively which are connected by a transverse transporter 13 which in the drawing is indicated by a line of dots and dashes.

The plant also comprises a number of trucks 14, each of which has one or more slab-shaped bottoms which, in combination with a wall arrangement in the casting station 1, can form the necessary mould. As is seen in FIG. 1, a return track 15 for the trucks 14 runs from the transverse transporter 13 to the casting station 1. According to a special implementation of the invention, this return track is situated between the autoclaves 2,3. In this way, a compact plan with minimized transport distances for the trucks is achieved.

The casting station 1 further comprises a transverse transporter (not shown) for moving a mould bottom and/or truck between the station and either of the waiting positions 5,6. Further, at these waiting positions, there should exist equipment for lifting and lowering of the relevant bottom or truck so that it will be possible to position one body above another on the truck before it enters the autoclave in question. The casting station could further comprise one or several cap scrapers (not shown) by which the cap that always develops at the top of the body can be removed and returned to the next mix of components, e.g. through the feed devices 31,32 (see FIG. 3) in the mixing device. Such cap scrapers can, with advantage, be built according to the suction principle and be positioned stationary at the sides of the casting station so that they, during transportation of the body between the casting station and the relevant waiting position, automatically cut and remove the cap for conveyance to the next mix.

Reference is made to FIG. 4, which shows the assembly of a mould 16 according to the invention. The mould comprises a bottom 17, which can be provided as a comparatively simple plate of sheet steel or similar material, and a wall arrangement, in its entity designated as 18. The wall arrangement 18 can be built as a number of outer load bearing panels or sheets 23 on the inside of which heat resistant sheets 24 of, e.g. polyurethane foam, are fixed. The use of such porous insulating sheets ensures that the mould wall is kept comparatively cool, a factor that is of vital importance insofar as the mould wall will be in contact with hot mixes with short intervals between consecutive castings. Wall arrangement 18 comprises two opposite long side walls 19,20 as well as two short side walls 21,22. The dimensions of the mould are: length=2.5 m, width=1.5 m and height=0.6 m, and in the mould a parallelepiped body of 2.25 cu. m can be cast. According to the invention, the plant may comprise but one wall arrangement 18, positioned in the casting station 1, whereas the mould bottom 17 is part of or follows each of the earlier mentioned trucks 14. The mould 16 can thus only be assembled in the casting station 1 by a suitable lowering of the wall arrangement 18 onto the bottom 17 whereby suitable seals effect the tightness between the mould bottom and the wall arrangement.

In the lower part of the wall arrangement 18, towards the bottom 17, it is advantageous to arrange cutting devices 25,26 in the form of wires in order to automatically divide the body that has stiffened in the mould into smaller elements as the wall arrangement is lifted from the mould bottom. To avoid adverse effects when cutting or dividing with these wires, it is possible to let the shorter walls 21,22, to which the longer wires 26 are connected, move upwards from the bottom 17 earlier than the longer walls 19,20, which carry the shorter wires 25, as is indicated by the dotted lines above the shorter walls. In this way, the wires 26 will move through the mass at a distance from the wires 25. It is, of course, also possible to change the order of movement and to let the wires 25 move before the wires 26. It is equally possible to let one of the opposite walls move before the other one so that the wires in question move obliquely. To avoid lateral movement of the wires at the beginning of the cutting operation, it is possible to arrange grooves or knobs (not shown) on the bottom 17, or the wires can be held by a paper or foil that, during casting, becomes so softened by the mix that it does not give resistance to the wires when cutting begins.

Turning next to FIG. 3, two mould bottoms are advantageously associated with each truck 14. Either each truck can have two loose bottoms or one fixed bottom 17 and one loose bottom 17', as is shown in FIG. 3A. Furthermore a number of loose pillar shaped supports 34 belong to each truck (see FIG. 3D) and can be used for carrying the loose mould bottom 17' at a distance above the fixed bottom 17 so that two bodies 35,36 can be positioned one above the other on the truck as is shown in FIG. 3D.

By putting two bodies on each truck in this way, an optimal utilization of the autoclaves, which are circular in cross section, is achieved.

If desired, the mould can—still in accordance with the invention—be provided with one or more partitions.

In FIG. 3A is shown a special mixing device, generally designated 27. This device comprises a mixing impeller 29 which is driven by a suitable power source 28 and which is situated in the lower part of a preferably mainly cylindrical mixing vessel 30 having a valve device (not shown) at the bottom. The mixing device also comprises a number of feed devices 31,32 which contain and/or feed the components into the mixing vessel.

Before the mode of operation of the plant shown in the drawings is described in detail, a formula suitable for the manufacture of aerated concrete in the plant shall be given. A preferred composition will comprise:

60–70%, and preferably about 65%, by weight silica material (sand)

18–24%, and preferably about 21%, by weight quick reacting lime

2–6%, and preferably about 4%, by weight portland cement

Figure 6:
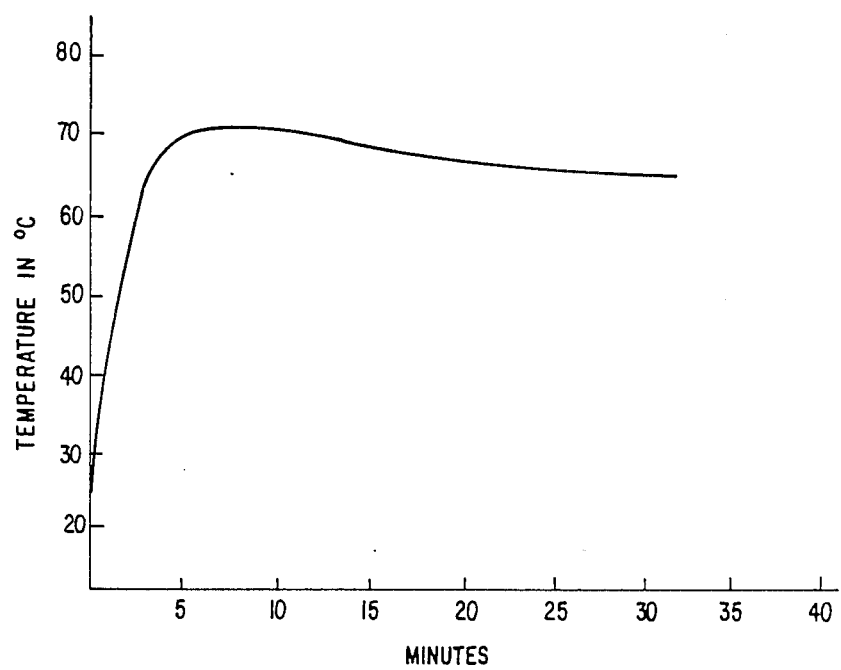
FIG. 6 illustrates the slaking curve of quick reacting lime that is suitable for use when practising the invention.

6–14%, and preferably about 10%, by weight return material (from previous mix) and aluminum powder, about 0.1%, by weight Water is added in such amount that the water/solids ratio will be 0.57/1. The quick reacting lime referred to above is of the steel works type and has a slaking curve, when tested according to the German standard method, as illustrated in FIG. 6.

When the components in question are mixed and homogenized, they should initially have as low a temperature as possible to ensure that the temperature in the mix during the following slaking and stiffening procedure does not increase to uncontrolled levels.

The plant described above works in the following way: An initial position is illustrated in FIG. 3A. The truck 14 has entered the casting station 1 with the bottom 17' on bottom 17 and the mould wall arrangement 18 connected with the bottom 17'. In this position, the components are fed into the mixing vessel via the feed devices 31,32. In the vessel, the components are subjected to intensive mixing by the impeller 29. The time for this mixing is extremely short and in practice only 40 to 60 seconds. Immediately after mixing is completed, the impeller is stopped and the valve device is opened so that the mixer can be emptied. The components flow out and rise to form the body designated by 35.

After rising is completed, the mass is allowed to stiffen during a stiffening time A that, when the formula above is used, is 9 to 10 minutes. During the stiffening period, the body attains sufficient stiffness to stand up without the support of the mould sides, which accordingly are lifted in accordance with FIG. 3B to a position above the body. At the same time, the body is divided into separate smaller elements by the wires 25,26 illustrated in FIG. 4.

In the next step, (FIG. 3C), the body 17' and the stiffened and divided body 35 are moved to the waiting position 5. This is performed by the previously mentioned transporter (not shown) at casting station 1, and at the same time the cap is removed as earlier described. The body 35 which has been moved to waiting position 5 is lifted to the position shown in FIG. 3C, in which the bottom 17' is positioned at a certain level above the top of the previous position of the body.

FIG. 3C also shows that the wall arrangement is lowered against the bottom 17.

After this the casting and dividing process described in connection with FIG. 3A and 3B is repeated so that a new body 36 is formed in accordance with FIG. 3D. This figure shows how the truck 14 with the body 36 resting upon the bottom 17 has been moved to the waiting position 5, where the supports 34 have been inserted between the two bottoms 17 and 17', with the latter resting on the supports. The truck is now ready to be moved into the autoclave. FIG. 3D also illustrates that a new truck 14', with bottoms 17 and 17', has entered the casting station where the process already described is repeated.

Suppose that, in the plant illustrated in FIG. 1, there are 30 trucks 14 each with two bottoms 17,17'. Each autoclave can hold 10 trucks simultaneously or, in other words, 20 bodies. The cycle time of the autoclaves is eight hours and the plant is supposed to run in three shifts, a new autoclave cycle starting every fours hours. From this it follows that the pacing time T is 12 minutes, which time exceeds the above mentioned stiffening time by a good margin. When the autoclave content is changed, the trucks with the cured bodies are pushed or pulled out of the factory proper, onto the tracks 11 and 12 which are waiting tracks. The unloading man pulls the trucks back as the unloading proceeds.

The unloading is performed with the help of a hoist that can lift the bodies as well as the trucks and bottoms. The bodies are lifted off and placed on palletizing or packaging tables and the trucks with the bottoms are put on the return track 15. The unloader has 24 minutes for each truck. The absolutely necessary personnel in each shift comprise, apart from the unloader, an autoclave attendant who also will watch the boiler plant, the caster and the grinder. To this is added personnel working daytime, such as a laboratory man, dispatch staff, management and maintenance staff.

In FIG. 2 is shown an alternative design for the plant in which the two autoclaves 2',3' are positioned close to each other and the return track 15' is positioned at the side of the autoclaves. Also the casting station 1' is positioned at the side of the two tracks 7' and 8' and over the return track 15'. In this way, the casting station can be made simpler than in the previous design and the cutting can take place in two separate stations 25' and 26'.

Figures 5A, 5B:
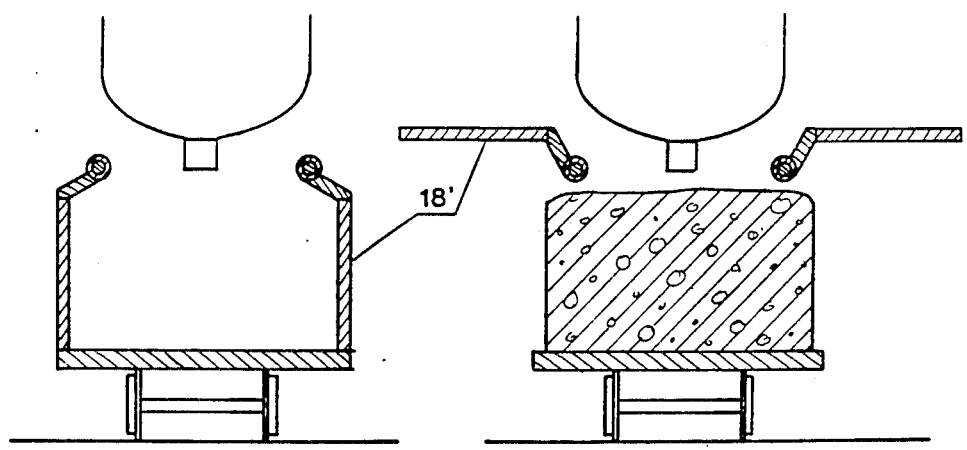
FIGS. 5A and 5B show an alternative form of the mould.

In this case the wall arrangement can, with advantage, be made with swing up sides 18' as illustrated in FIG. 5.

The extremely short reaction time of the components can in practise be achieved by dry grinding of the components, preferably by grinding them together. If the mill in question is adequately dimensioned in relation to the capacity of the plant, previously used large silo capacities can be dispensed with and it will be sufficient to employ a mill and a container for an hour of production or less.

The advantages of the invention are obvious since it makes it possible to erect a factory in which the relation between production and investment is optimal.

It is clear that the invention is not limited to the designs described and shown in the drawings. Thus it is possible to use the principle according to the invention also during manufacture of calcium silicate hydrate materials other than conventional aerated concrete. E.g., the principle of the invention can be utilized in connection with manufacture of foam- or cell-concrete and also during manufacture of aerated concrete modified in certain ways, e.g. a material manufactured without steam curing and/or without the use of pore forming material. Further the division of the body into smaller elements can be left out, in which case the body can be utilized for grinding to finely disperse calcium silicate hydrate material for other purposes than building. The plant can, if so desired, have two or more moulds, one or more of the moulds being spares. Furthermore the stiffening time can be as short as 7 or 8 minutes. Instead of transporting the bodies horizontally, it is possible to turn them on end before cutting or autoclaving. Instead of trucks, it is possible to use other means of transportation, e.g. various types of chain transporters. Also other modifications are possible within the framework of the invention.

I claim:

1. A method for the manufacture of aerated concrete material, comprising the steps of:
   (a) preparing a quick-stiffening mixture of at least one silica containing material, at least one calcareous binder, a rising agent, and water;
   (b) pouring the mixture into a mould which is assembled from a plurality of mould elements;
   (c) allowing the material in the mould to stiffen during a stiffening time to a semiplastic body;
   (d) disassembling the mould and releasing the semiplastic body;
   (e) repeating step (a);
   (f) pouring the mixture of step (e) into a mould which is assembled from at least one mould element that was used in step (b) and at least one mould element that was not used in step (b), step (f) being conducted a predetermined pacing time after step (b), with the stiffening time always being kept shorter than the pacing time so that said at least one mould element that was used in step (b) can be employed; and
   (g) repeating steps (c) and (d).

2. A method according to 1, wherein step (a) is conducted using an extremely high reactive binder as a calcareous binder, which will provide an exceptionally short stiffening time of the mixture and thereby permit a short pacing time.

3. A method according to 1, wherein step (b) is conducted by pouring the mixture into a mould which is assembled from a wall arrangement and a bottom, and wherein step (f) is conducted using a mould which is assembled from the same wall arrangement and a different bottom.

4. A method according to 3, wherein step (a) is conducted in a casting station having a mixing device with an impeller as well as feed devices by feeding said at least one silica containing material, said at least one calcareous binder, said rising agent and said water into the mixing device and intimately mixing them with the impeller; and wherein step (d) is conducted by separating the bottom of the mould and the wall arrangement from each other after the mixture has stiffened to form the semiplastic body, which remains resting on the bottom, and further comprises dividing the semiplastic body into elements with cutting wires arranged between opposite walls of the wall arrangement, and thereafter removing the bottom from the casting station.

5. A method according to claim 1, wherein step (a) is conducted by preparing the mixture stepwise.

6. A method according to claim 1, wherein step (a) is conducted using steel works lime as a calcareous binder, which will provide an exceptionally short stiffening time of the mixture and thereby permit a short pacing time.

7. A method for the manufacture of aerated concrete material in cycles, each cycle comprising the steps of:
   (a) preparing a quick-stiffening mixture which includes at least silica material, a rising agent, calcareous binding material, and water in a vessel;
   (b) emptying the mixture from the vessel to a mould formed by a bottom and a removable wall arrangement;
   (c) allowing the material in the mould to stiffen for a predetermined stiffening time that is shorter than the time between the emptying step in two consecutive cycles in order to form a body; and
   (d) removing the wall arrangement upon expiration of the stiffening time,
   wherein the bottom used in step (b) of each cycle is different from the bottom that is used in step (b) of the next cycle.

8. A method according to claim 7, wherein step (d) further comprises dividing the body into a plurality of elements using wires which are affixed to the wall arrangement and which slice the body when the wall arrangement is removed.

9. A method according to claim 8, further comprising the step of loading a first bottom which supports a divided body that was formed in one cycle and a second bottom which supports a divided body that was formed in the next cycle onto a vehicle and sending the vehicle to an autoclave.

10. A method according to claim 7, wherein step (a) is conducted a calcareous binding material which includes highly reactive lime.

11. A method according to claim 7, wherein step (a) is accomplished in said vessel by stirring the material therein with an impeller.

12. A method according to claim 7, wherein step (a) is accomplished in said vessel by stirring the material therein for a period of time ranging from about 40 to about 60 seconds.

13. A method according to claim 7, wherein said time between the emptying time in two consecutive cycles is about twelve minutes and wherein step (d) is conducted upon expiration of a stiffening time that is shorter than twelve minutes.

14. A method according to claim 7, wherein step (a) is accomplished by mixing 60–70% by weight of sand, 18–25% by weight of quick reacting lime, 2–6% by weight of portland cement, 6–14% by weight of return material that was mixed in the previous cycle, about 0.1% by weight of aluminum powder, and enough water to provide a water/solids ratio of about 0.6/1, the quantities of said materials being sufficient to provide a body having a volume of over 2 cubic meters.

15. A method according to claim 7, wherein step (a) is conducted to provide a mixture which rises in temperature by over 30° C. in less than ten minutes.

16. A method according to claim 7, further comprising cooling at least one of said silica material, said calcareous binding material, and said water prior to conducting step (a).

17. A method according to claim 16, wherein the maximum temperature achieved by the mixture ranges between about 65° C. and 75° C.

18. A method for the manufacture of aerated concrete, comprising:
   (a) preparing a quick-stiffening mixture by mixing at least silica material, calcareous binder material, a rising agent, and water in a vessel;
   (b) emptying the vessel into a mould formed by a first bottom and a moveable wall arrangement;
   (c) allowing the material in the mould to stiffen for a stiffening time;
   (d) removing the wall arrangement upon expiration of the stiffening time to provide a first body disposed on the first bottom;
   (e) again preparing a quick-stiffening mixture by mixing at least silica material, calcareous binder material, a rising agent, and water in the vessel;
   (f) emptying the vessel into a mould formed by a consecutive second bottom and the same removable wall arrangement;

(g) allowing the material in the mould to stiffen for said stiffening time;

(h) removing the wall arrangement upon expiration of said stiffening time to provide a second body disposed on the second bottom; and (i) moving the first and second bottoms and the first and second bodies disposed thereon to means for further treating the bodies.

19. The method of claim 18, wherein steps (c) and (g) are conducted by allowing the material in the mould to stiffen and rise for a stiffening time that is less than an hour.

20. The method of claim 19, wherein said stiffening time is less than half an hour.

21. The method of claim 20, wherein said stiffening tme is less than a quarter hour.

22. The method of claim 19, wherein said first and second bodies are semiplastic when the wall arrangement is removed in steps (d) and (h), wherein said means for further treating the bodies comprises an autoclave, and further comprising cutting the first and second bodies into elements while they are still semiplastic and before step (i) is conducted.

23. The method of claim 22, further comprising cooling at least one of said silica material, said calcareous binder material, and said water before conducting steps (a) and (e).

24. A method for molding aerated concrete, comprising:

(a) mixing quick-stiffening material in mixing means located at a work station, said material including silica material, calcareous binder material, a rising agent, and water;

(b) pouring mixed material from said mixing means into mould forming means located at said work station, said mould forming means being in a first working position wherein said mould forming means together with a transport means form a mould capable of receiving mixed material from said mixing means and being capable of assuming a second working position wherein said mould forming means is separated from said transport means to enable the latter to remove from said work station a workpiece which has set in said mould forming means;

(c) moving said mould forming means from said first working position to said second working position after the mixed material therein has set; and (d) removing said transport means from said work station, with the set material supported thereon, and moving another transport means into the work station to form a mould together with said mould forming means.

25. The method of claim 24, further comprising cooling at least one of said silica material, said calcareous binder material, and said water before completing step (a).

26. The method of claim 24, wherein said mixing means includes an impeller and wherein step (a) is conducted by mixing said material with said impeller for less than a minute.

27. The method of claim 24, wherein said transport means and said another transport means are vehicles having horizontal platforms, wherein said mould forming means comprises pivotably mounted walls which are moveable from a vertical position containing said platforms to an inclined position spaced apart from said platforms, and wherein step (c) is conducted by moving said walls from the vertical position to the inclined position.

28. The method of claim 24, wherein said transport means and said another transport means are vehicles having horizontal platforms, wherein said mould forming means comprises walls which are linearly moveable from a position contacting said platforms to a position above said platforms, and wherein step (c) is conducted by raising said walls.

29. The method of step 24, further comprising dividing the step material on said transport means into elements and moving the transport means and elements to an autoclave.

30. The method of claim 24, wherein step (d) comprises moving said transport means, with the set material supported therein, to another work station having cutting means, and further comprising dividing the set material on the transport means into elements at said another station using said cutting means.

* * * * *